C. F. LANG.
Fruit Gatherer.
No. 83,178
Patented Oct. 20, 1868.
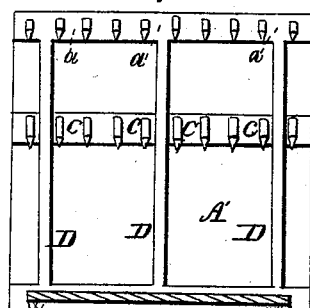
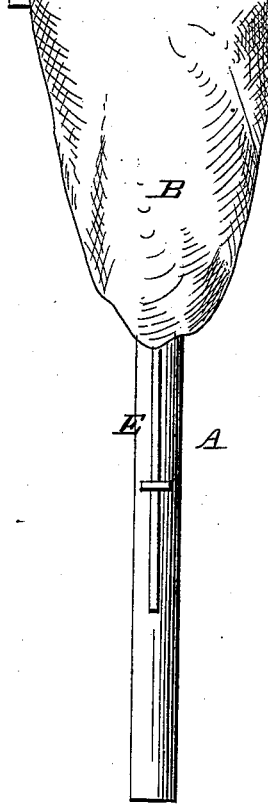
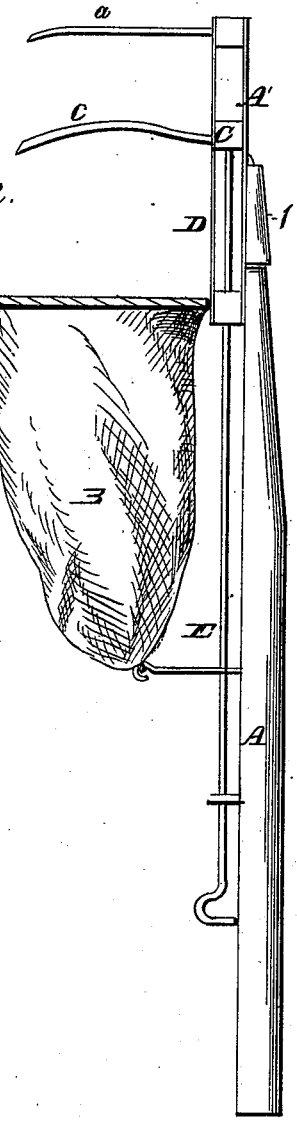
WITNESSES:
H. Pauly
Robert Burns.
INVENTOR:
F. Lang
by his atty. M. Randolph & Co.

CHARLES F. LANG, OF VENEDY, ILLINOIS

Letters Patent No. 83,178, dated October 20, 1868.

IMPROVEMENT IN FRUIT-GATHERER.

The Schedule referred to in these Letters Patent and making part of the same.

*To all whom it may concern:*

Be it known that I, CHARLES F. LANG, of Venedy, in the county of Washington, and State of Illinois, have made certain new and useful Improvements in Fruit-Gatherer for small fruits; and I do hereby declare that the following is a full and clear description thereof, reference being had to the accompanying drawings, and to the letters of reference marked thereon.

This invention relates to an instrument for gathering fruit, such as cherries, plums, &c., and consists of a set of projecting hooks, attached to the end of a long pole in a rigid position; also a set of sliding hooks, placed just below the rigid hooks, and actuated by a sliding rod in such a manner as to pull off the fruit, while the rigid hooks hold up the branches. A suitable pouch or sack is attached to the handle, just below the hooks, in such a position as to receive the fruit as it drops from the branches.

To enable those skilled in the art to make and use my improved fruit-gatherer, I will proceed to describe its construction and operation.

Figure 1 of the drawings is a front elevation of the improved fruit-gatherer, and Figure 2 is a side elevation of the same.

The handle or pole A has a head-piece, A', which is provided with hooks a, fixed rigidly to it, and projecting from it nearly at right angles. These hooks should be a short distance apart, as shown in fig. 1, sufficiently far to allow the stems of the fruit to pass between them, but not far enough to let the fruit pass through. A sliding head, C, provided with hooks c, similar to those above described, is arranged to slide up and down on the head-piece A', and is held in the proper position, with reference to the head-piece A, by means of the ways or guides D. The handle E has its upper end secured to the head C, and passes thence down by the side of the handle A in such a position that its lower end may easily be grasped by the operator, who will use the instrument, so as to close the movable hooks up against the fixed hooks, then insert the two sets of hooks, closed in this position, between the fruit and the branch. Then pull down on the handle or rod E, and thus remove the fruit from the branch, while the upper hooks hold the branch during the operation. The pouch or bag B attached to A receives the fruit as it falls from the tree.

Having described my invention,

What I claim, is—

The combination of the head-piece A', hooks a, sliding head C, hooks c, guides D, operating-handle E, and pouch B, substantially as and for the purposes set forth.

CHARLES F. LANG.

Witnesses:
   M. RANDOLPH,
   ROBERT BURNS.